Patented Nov. 28, 1939

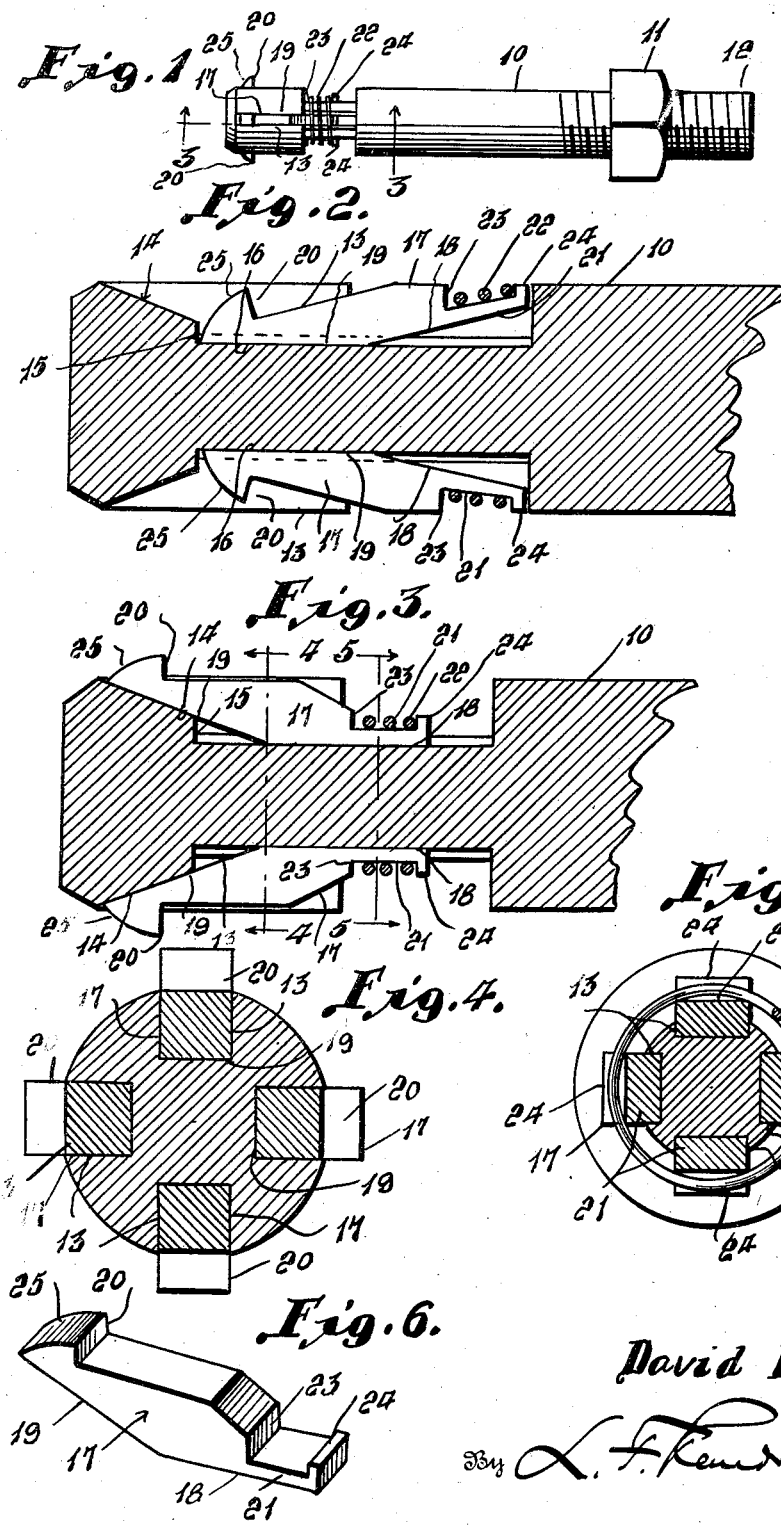

2,181,657

UNITED STATES PATENT OFFICE 2,181,657

POSITIVE GRIP HEADLESS BOLT

David Herst, Lebanon, Pa.

Application September 8, 1938, Serial No. 229,031

5 Claims. (Cl. 85—3)

This invention relates to a positive grip headless bolt.

It is aimed to provide a novel bolt especially useful where it is impractical and impossible and inadvisable to use the ordinary or standard type bolt advantageously and it especially aims to provide such a bolt as may be applied through the bolt opening and have expanding parts to function as the head after passage to the desired extent through such opening.

Such a construction in many instances, will materially reduce the labor involved and will avoid the necessity of first tapping and then setting stud bolts or the equivalent.

The more specific objects and advantages will become apparent from a consideration of the description following taken in connection with accompanying drawing illustrating an operative embodiment.

In said drawing:

Figure 1 is a view in elevation of a bolt constructed in accordance with the invention;

Figure 2 is a longitudinal sectional view through the head end of the bolt, with the head parts retracted;

Figure 3 is a horizontal section taken on the line 3—3 of Figure 1;

Figure 4 is a detail cross section taken on the line 4—4 of Figure 3;

Figure 5 is a detail cross section taken on the line 5—5 of Figure 3; and

Figure 6 is a detail perspective view of one of the head members.

Referring specifically to the drawing wherein like reference characters designate like or similar parts, 10 designates a bolt shank which is adapted to be fastened for instance by means of a nut 11 engaging screw threads 12 thereon.

It will be noted that the shank itself is headless and has no projection beyond its periphery even at the head end of the bolt. At such end, a number of longitudinal recesses are provided, for instance four, as at 13, the forward base walls of which recesses are inclined outwardly and away from the longitudinal axis of the shank as at 14, a shoulder 15 being provided at the junction thereof with the remainder of the base wall of the recess 16, which is parallel to the longitudinal axis.

Disposed slidably and rockably in each recess 13 is a head member 17 as detailed in Figure 6. Such head members have surfaces at an angle to each other as at 18 and 19. Such head members are of the same depth as the recesses so that the head members may be completely received in such recesses as shown in Figure 2. Said head members have shoulders at 20.

At the inner end portions, the head members are reduced as at 21 and are surrounded by a contractile coil spring 22, the latter being held against displacement between shoulders 23 and 24 on such reduced portions.

In applying the shank 10 to the parts to be bolted together, they are passed with the left hand end foremost through the bolt hole in the parts, the head members 17 being displaced, aided by their beveled or chamfered edges 25, into the recesses 13, as shown in Figure 2. When the shoulders 20 are free of the parts to be bolted, spring 22 contracts in order to expand the shoulder ends of the head members and cause the shoulders 20 to overlap the members like a head. Tightening of the nut 11 serves to positively grip the shoulders or head members with the parts being secured and an effective and cam wedging action takes place through the coaction of surfaces 19 with surfaces 18, as best shown in Figure 3.

Various changes may be resorted to provided they fall within the spirit and scope of the invention.

I claim as my invention:

1. A bolt having a shank, said shank provided with a recess open at its periphery, a slidable and rockable head member retractable within the recess so that the shank may be applied to a bolt hole, means to project said member beyond the periphery of the shank to function as a head, and means on the shank engageable with the said member to retain the latter in projected position.

2. A bolt having a shank, said shank provided with a recess open at its periphery, a slidable and rockable head member retractable within the recess so that the shank may be applied to a bolt hole, contractile means urging projection of the head member beyond the periphery of the shank to function as a head, one wall of the head member engaging the base of the recess and being shaped to rock thereon to control the projection of the head member, comprising a spring, the head member having a reduced portion engaged by the spring and shoulders to retain the spring against displacement.

3. A bolt having a shank, said shank provided with a recess open at its periphery, a slidable and rockable head member retractable within the recess so that the shank may enter a bolt hole, means urging projection of the head member relatively to the periphery of the shank to function as a head, the base wall of said recess being a cam at one portion thereof, and said head member having a surface co-acting with said cam upon sliding of the head member to cause the latter to project beyond the periphery of the shank.

4. A bolt having a shank, said shank provided with a recess open at its periphery, a slidable and rockable head member retractable within the recess so that the shank may enter a bolt hole, means urging projection of the head member relatively to the periphery of the shank to function as a head, the base wall of said recess being a cam at one portion thereof, said head member at the inner edge having surfaces at an angle to each other, one co-acting with said cam upon sliding of the head member to cause the latter to project beyond the periphery of the shank.

5. A bolt having a shank, said shank having a series of recesses open at the periphery, said recesses having cam surfaces, head members having surfaces at an angle to each other, one surface of each head member co-acting with an adjacent cam, said head members being retractable within the recesses, spring means surrounding the head members adjacent their inner ends urging contraction of such ends and expansion of the other ends, said head members at said other ends being chamfered and having shoulders to which the chamfers lead.

DAVID HERST.